United States Patent [19]
Yun

[11] Patent Number: 5,864,196
[45] Date of Patent: *Jan. 26, 1999

[54] ROTOR FOR A MOTOR INCLUDING NON-MAGNETIC PLATES LAMINATED BETWEEN SILICON STEEL SHEETS

[76] Inventor: Ja Dong Yun, 2/6, 186-114, Dongjak-Ku, Huksuk-Dong, Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 717,156

[22] Filed: Sep. 20, 1996

[30] Foreign Application Priority Data

Sep. 20, 1995 [KR] Rep. of Korea .................. 1995 25406

[51] Int. Cl.$^6$ ....................................................... H02K 1/22
[52] U.S. Cl. ........................ 310/261; 310/262; 310/211; 310/216; 310/156
[58] Field of Search ...................................... 310/261, 262, 310/216, 156, 211

[56] References Cited

U.S. PATENT DOCUMENTS 4,472,651  9/1984  Jones ......................................... 310/156
5,444,319  8/1995  Nakamura et al. ...................... 310/211

*Primary Examiner*—Thomas M. Dougherty
*Assistant Examiner*—Timothy A. Williams
*Attorney, Agent, or Firm*—Jacobson, Price, Holman & Stern, PLLC

[57] ABSTRACT

A rotor for a motor which can provide a great supply of mechanical power using only slightly more input power, because magnetization is sped up when the rotor is rotated by a rotating magnetic field from a stator. The rotor includes laminated sheets of silicon steel. The weight of the rotor is separated into several pieces by inserting a non-magnetic plate between laminated sheets of silicon steel which make up the rotor. The phase angle of the rotor therefore remains synchronized with the rotating magnetic field from the stator.

4 Claims, 1 Drawing Sheet

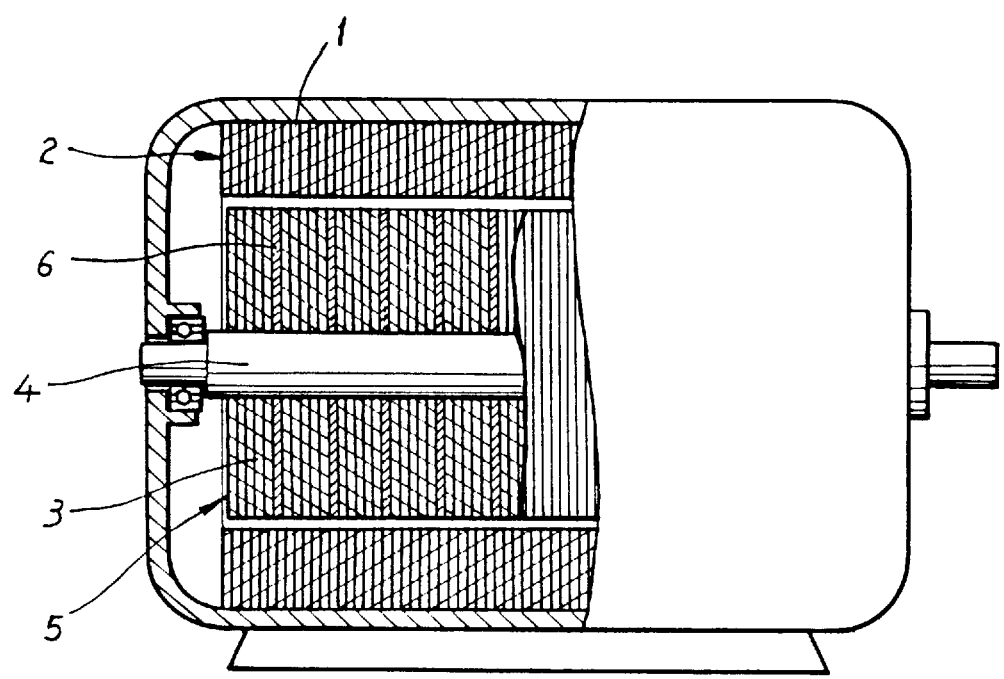

ROTOR FOR A MOTOR INCLUDING NON-MAGNETIC PLATES LAMINATED BETWEEN SILICON STEEL SHEETS

FIELD OF THE INVENTION

The present invention relates to a rotor for a motor, and more particularly to a rotor in which non-magnetic plates are inserted between given numbers of silicon steel sheets when laminating the silicon steel sheets to make the rotor.

BACKGROUND OF THE INVENTION

Conventionally, the rotor for a motor is formed from a lamination of silicon steel sheets (e.g. S-18 silicon steel sheets having the composition of 18% silicon by weight). Such an arrangement, although generally effective, does have certain disadvantages. For example, a lot of energy is required to rotate the rotor because the rotating magnetic field generated by the stator bears a heavy load due to the rotor's own weight. In addition, the wear on the rotor is heavy because significant slipping occurs between the rotating magnetic field and the rotor, and therefore, a significant amount of heat is generated from the stator.

SUMMARY OF THE INVENTION

To solve these problems, the purpose of the present invention is to provide a rotor for a motor by laminating silicon steel sheets which can speed up magnetization when the rotor is rotated by a rotating magnetic field, wherein the weight of the rotor is separated into several pieces. In particular, this is accomplished by laminating non-magnetic plates between given numbers of silicon steel sheets to form a composite. A great supply of mechanical power, can thus be achieved using only slightly more input power especially since the phase angle of the rotor remains synchronized with the rotating magnetic field. The slip of the motor is therefore small, making the rotating torque correspondingly strong.

BRIEF DESCRIPTION OF THE DRAWINGS

FIG. 1 shows a partially cross sectional view of a rotor for a motor in accordance with the present invention.

DESCRIPTION OF A PREFERRED EMBODIMENT

The present invention will now will be described with reference to the accompanying drawing.

FIG. 1 shows a partially cross sectional view of a rotor for a motor in accordance with the present invention. In the drawing, a rotor 5 includes silicon steel sheets 3 which are laminated at a rotating shaft 4 within a stator 2, the stator 2 also having laminated silicon steel sheets 1. The rotor is made by inserting at least one non-magnetic plate 6 in sheet form between given numbers of silicon steel sheets 3 to form a composite which is connected to the rotating shaft 4.

An acting effect of the present invention constructed as above will be described below.

The present invention has an outstanding effect which can achieve minimal wear of the motor. This effect is achieved by constructing the rotor 5 with at least one non-magnetic plate 6 inserted in sheet form between given numbers of silicon steel sheets 3 which are laminated at a rotating shaft 4 within the stator 2, the stator 2 having laminated silicon steel sheets 1. The weight of the rotor 5 is thus separated into several pieces. The resulting arrangement provides a great supply of mechanical power using only slightly more input power, especially since the phase angle of the rotor 5 remains synchronized with the rotating magnetic field. The slip of the motor is therefore small. Furthermore, when the rotor is rotated by a rotating magnetic field, magnetization speeds up.

S-18 silicon steel has a composition of 18% silicon by weight.

I claim:

1. A rotor for an electric motor, said rotor comprising:

a shaft;

sheets of silicon steel laminated to one another on said shaft; and at least one non-magnetic plate laminated between a certain number of said sheets of silicon steel having a certain weight to separate the certain weight of said sheets of silicon, the at least one non-magnetic plate consisting of no more than one opening, said opening receiving said shaft, and the at least one non-magnetic plate forming a composite which is connected to said shaft for rotation therewith.

2. The rotor of claim 1, wherein said sheets of silicon steel and said at least one non-magnetic plate are annular, said shaft being located axially through said sheets of silicon steel and said at least one non-magnetic plate.

3. A rotor for a motor, said rotor comprising:

a shaft;

a first group of silicon steel sheets laminated to one another at said shaft;

at least one more group of silicon steel sheets laminated to one another at said shaft; and at least one non-magnetic plate laminated between said first group of silicon steel sheets and said at least one more group of silicon steel sheets, each group having a certain weight, to separate the certain weight of said first group and said at least one more group of silicon steel sheets, the at least one nonmagnetic plate consisting of no more than one opening, said opening receiving said shaft, and the at least one non-magnetic plate forming a composite which is connected to said shaft for rotation therewith.

4. The rotor of claim 3, wherein said silicon steel sheets and said at least one non-magnetic plate are annular, said shaft being located axially through said silicon steel sheets and said at least one non-magnetic plate.

* * * * *